US012670406B1

(12) United States Patent
Antebi et al.

(10) Patent No.: US 12,670,406 B1
(45) Date of Patent: Jun. 30, 2026

(54) CONFIDENCE-BASED REWARD FOR GROUP RELATIVE POLICY OPTIMIZATION IN LANGUAGE MODELS

(71) Applicant: Intuit Inc., Mountain View, CA (US)

(72) Inventors: Sagiv Antebi, Tel Aviv (IL); Matan Vetzler, Tel Aviv (IL); Shai Ardazi, Tel Aviv (IL); Ofir Ben Shoham, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/282,599

(22) Filed: Jul. 28, 2025

(51) Int. Cl.
| | |
|---|---|
| *G06N 3/0895* | (2023.01) |
| *G06N 3/02* | (2006.01) |
| *G06N 3/08* | (2023.01) |
| *G06N 3/092* | (2023.01) |
| *G06N 3/094* | (2023.01) |
| *G06N 20/00* | (2019.01) |

(52) U.S. Cl.
CPC ............. *G06N 3/0895* (2023.01); *G06N 3/02* (2013.01); *G06N 3/08* (2013.01); *G06N 3/092* (2023.01); *G06N 3/094* (2023.01); *G06N 20/00* (2019.01)

(58) Field of Classification Search
CPC .......... G06N 3/0895; G06N 3/02; G06N 3/08; G06N 3/092; G06N 3/094; G06N 20/00
See application file for complete search history.

(56) References Cited

U.S. PATENT DOCUMENTS

| | | | |
|---|---|---|---|
| 2022/0210026 A1* | 6/2022 | Yan | H04L 47/29 |
| 2022/0269863 A1* | 8/2022 | Araki | G06F 40/169 |

| | | | |
|---|---|---|---|
| 2023/0367696 A1* | 11/2023 | Liu | G06N 3/08 |
| 2025/0251932 A1* | 8/2025 | Hensley | G06F 16/31 |
| 2025/0253016 A1* | 8/2025 | Hafen | G06F 16/248 |

OTHER PUBLICATIONS

Guo et al., "DeepSeek-R1: Incentivizing Reasoning Capability in LLMs via Reinforcement Learning", Jan. 22, 2025, arXiv, v1, pp. 1-22 (Year: 2025).*
Valentin et al., "Cost-Effective Hallucination Detection for LLMs", 2024, arXiv, v2, pp. 1-17 (Year: 2024).*
Li et al., "Optimizing Safe and Aligned Language Generation: A Multi-Objective GRPO Approach", Mar. 26, 2025, arXiv, v1, pp. 1-15 (Year: 2025).*
Stangel et al., "Rewarding Doubt: A Reinforcement Learning Approach to Calibrated Confidence Expression of Large Language Models", May 23, 2025, arXiv, v3, pp. 1-16 (Year: 2025).*

* cited by examiner

*Primary Examiner* — Mark D Featherstone
(74) *Attorney, Agent, or Firm* — Dinsmore & Shohl LLP

(57) ABSTRACT

Certain aspects of the disclosure provide a method for training a language model (LM) including: generating, using an LM, one or more outputs; computing a confidence score of an output of the one or more outputs based on a perplexity value of the output; determining, by a group relative policy optimization (GRPO)-based model, that the output is: associated with a correct status based on a reference policy; and associated with an uncertain status based on the confidence score and a threshold; determining, by the GRPO-based model, an increased reward value for the output that is associated with the correct status and the uncertain status based at least in part on a base reward value and the confidence score; causing, by the GRPO-based model, a reinforcement of the output using the increased reward value; and training the LM in accordance with the reinforcement of the output.

20 Claims, 6 Drawing Sheets

200

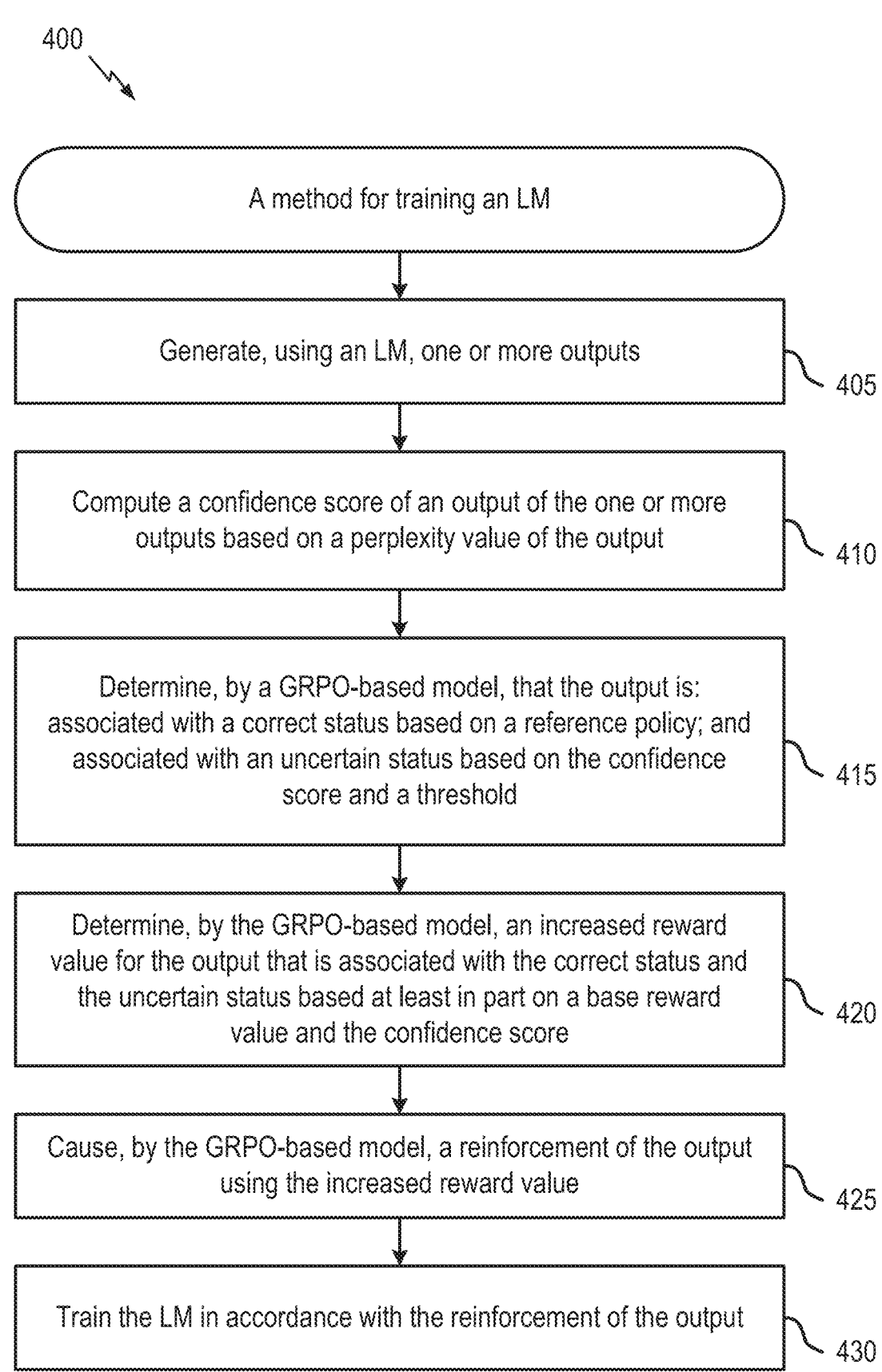

400

A method for training an LM

Generate, using an LM, one or more outputs — 405

Compute a confidence score of an output of the one or more outputs based on a perplexity value of the output — 410

Determine, by a GRPO-based model, that the output is: associated with a correct status based on a reference policy; and associated with an uncertain status based on the confidence score and a threshold — 415

Determine, by the GRPO-based model, an increased reward value for the output that is associated with the correct status and the uncertain status based at least in part on a base reward value and the confidence score — 420

Cause, by the GRPO-based model, a reinforcement of the output using the increased reward value — 425

Train the LM in accordance with the reinforcement of the output — 430

*FIG. 4*

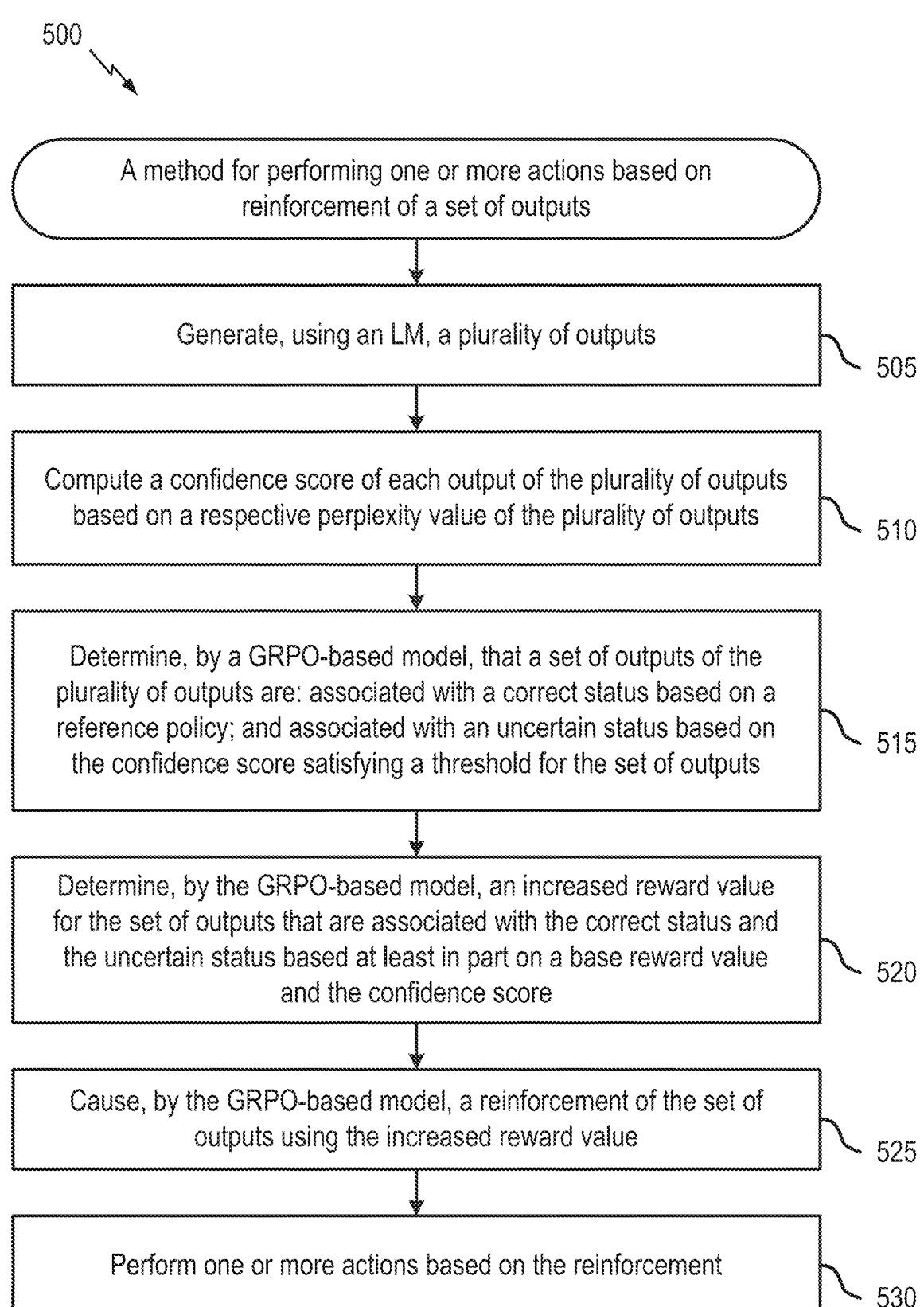

500

A method for performing one or more actions based on reinforcement of a set of outputs Generate, using an LM, a plurality of outputs — 505

Compute a confidence score of each output of the plurality of outputs based on a respective perplexity value of the plurality of outputs — 510

Determine, by a GRPO-based model, that a set of outputs of the plurality of outputs are: associated with a correct status based on a reference policy; and associated with an uncertain status based on the confidence score satisfying a threshold for the set of outputs — 515

Determine, by the GRPO-based model, an increased reward value for the set of outputs that are associated with the correct status and the uncertain status based at least in part on a base reward value and the confidence score — 520

Cause, by the GRPO-based model, a reinforcement of the set of outputs using the increased reward value — 525

Perform one or more actions based on the reinforcement — 530

FIG. 5

CONFIDENCE-BASED REWARD FOR GROUP RELATIVE POLICY OPTIMIZATION IN LANGUAGE MODELS

BACKGROUND

Field

Aspects of the present disclosure relate to confidence-based reward for group relative policy optimization (GRPO) in language models (LMs).

Description of Related Art

Artificial Intelligence (AI) includes generative artificial intelligence (GenAI) which refers to machine learning models that are able to create new content based on patterns and information learned from training data in combination with a user prompt. The user prompt provides instructions to the model on what new content to generate and how to generate that new content. Notably, the model is able to generate new content based on both the actual information (e.g., facts, knowledge) included in the training data, as well as patterns, insights, and model parameter weights learned from the training data.

GenAI models are able to generate new content in many different forms, including text, image, audio, and even video. For example, to facilitate text generation, some GenAI models are configured as LMs. An LM is generally a type of machine learning model that is designed to understand, generate, and manipulate human language. More specifically, an LM is a probabilistic framework that determines the likelihood of a sequence of words or tokens. At its core, a LM attempts to predict the probability of the next word in a sentence given the preceding words. The LM estimates these probabilities based on the patterns the LM learned during training. LMs are useful in natural language processing (NLP) and computational linguistics for performing a range of tasks involving human language. An LM may include a large language model (LLM) which is typically trained on significantly larger datasets and has more parameters than other LMs.

LMs have a wide array of applications, including: text generation (e.g., producing coherent and contextually appropriate text; machine translation (e.g., converting text from one language to another); speech recognition (e.g., converting spoken language into text); text summarization (e.g., condensing a long piece of text into a shorter summary); sentiment analysis (e.g., determining the sentiment expressed in a piece of text); and question answering (e.g., automatically providing answers to questions posed in natural language).

SUMMARY

Certain aspects provide a method that includes generating, using a language model (LM), one or more outputs; computing a confidence score of an output of the one or more outputs based on a perplexity value of the output; determining, by a group relative policy optimization (GRPO)-based model, that the output is: associated with a correct status based on a reference policy associated with an uncertain status based on the confidence score and a threshold; determining, by the GRPO-based model, an increased reward value for the output that is associated with the correct status and the uncertain status based at least in part on a base reward value and the confidence score; causing, by the GRPO-based model, a reinforcement of the output using the increased reward value; and training the LM in accordance with the reinforcement of the output.

Certain aspects provide a method that includes generating, using an LM, a plurality of outputs; computing a confidence score of each output of the plurality of outputs based on a respective perplexity value of the plurality of outputs; determining, by a GRPO-based model, that a set of outputs of the plurality of outputs are: associated with a correct status based on a reference policy associated with an uncertain status based on the confidence score satisfying a threshold for the set of outputs; determining, by the GRPO-based model, an increased reward value for the set of outputs that are associated with the correct status and the uncertain status based at least in part on a base reward value and the confidence score; causing, by the GRPO-based model, a reinforcement of the set of outputs using the increased reward value; and performing one or more actions based on the reinforcement.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 4 depicts a flowchart of an example method for training an LM in accordance with reinforcement of an output of the LM.

FIG. 5 depicts a flowchart method for performing one or more actions based on reinforcement of a set of outputs of the LM.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
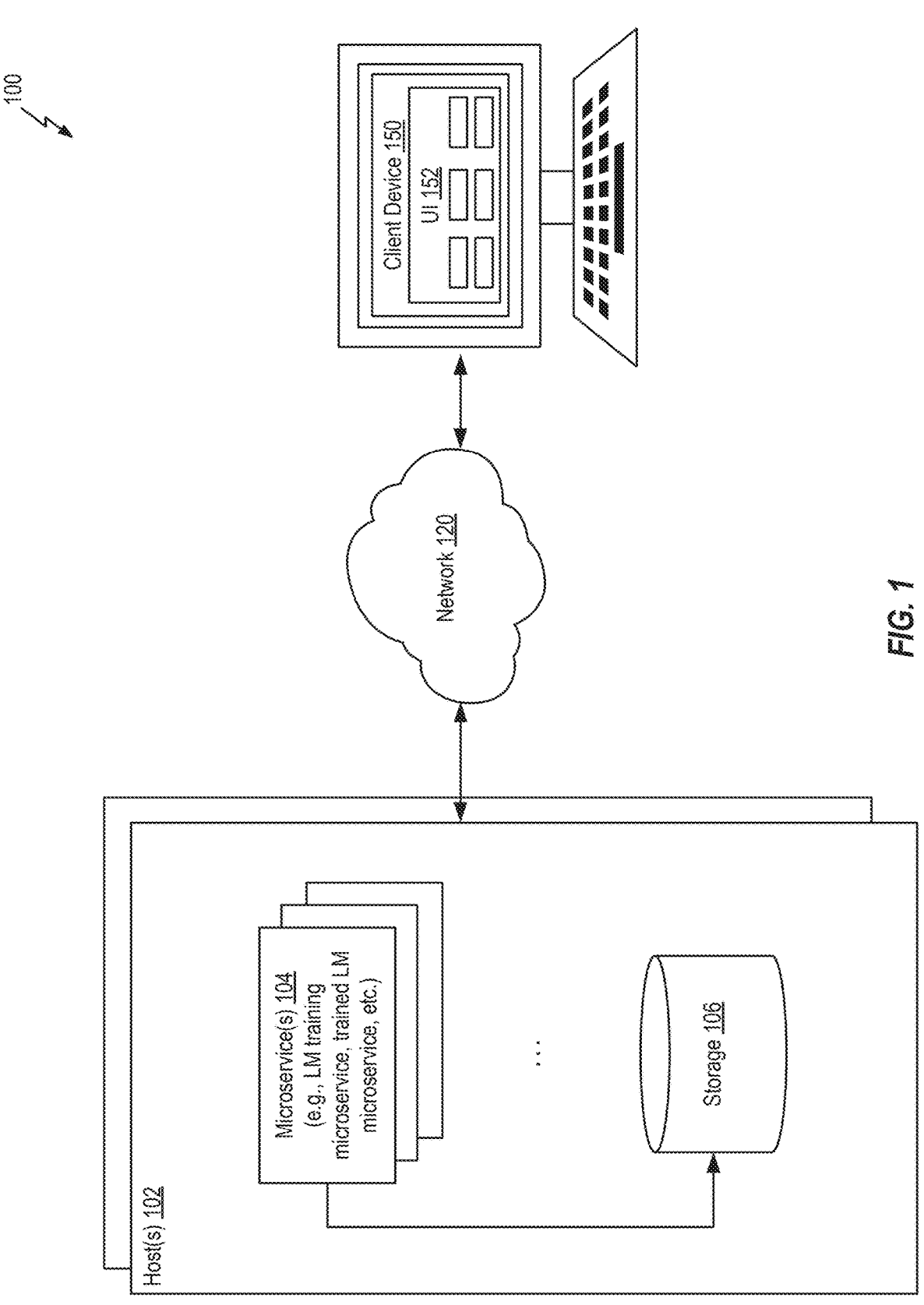
FIG. 1 is a schematic system diagram illustrating an example processing system supporting microservices interconnected via a network.

Aspects of the present disclosure provide apparatuses, methods, processing systems, and computer-readable mediums for a confidence-based reward for group relative policy optimization (GRPO) in language models (LMs).

As described, some of the applications of LMs include text generation, text summarization, and question answering. For example, a user may ask an LM a question that the LM uses to generate an answer based on its training. To generate the answer, the LM determines a first output (e.g., first token of the answer), determines the next output (e.g., next token of the answer) based in part on previously generated token(s) (here, the first output), and repeats the process to form a full answer. To generate an output, the LM may create a list of outputs that could be used as the next output. The LM determines a probability of each output of the list. In some examples, the LM then selects the next output based on the probability of the outputs in the list, e.g., selects the output with the highest probability. Generally, the selected outputs are associated with a correct status, e.g., the output is factually correct, logically coherent, without errors, etc. However, in some cases, an LM may generate an output that is associated with an incorrect status. That is, the output may be factually incorrect, logically incoherent, erroneous, etc.

LMs can be trained using reinforcement learning methods, which may include various steps such as learning to determine what actions to perform (e.g., defining a policy) in an environment based on rewards and/or penalties for actions, where actions associated with high rewards are favored. A reward may refer to an indication that an action (e.g., that causes the generation of a certain output) is desirable, should be repeated, causes a desirable LLM behavior, etc., A penalty may refer to an indication that an action (e.g., that causes the generation of a certain output) is not desirable, should not be repeated, cause a undesirable LLM behavior, etc. These rewards and penalties are used to train the LM, for example, to determine model parameters based on the rewards, penalties, and corresponding actions.

Reinforcement learning methods may include Group Relative Policy Optimization (GRPO), critic-based models, or other methods. More specifically, GRPO replaces traditional critic-based models with relative scoring from a group of outputs of the LM. GRPO is a reinforcement learning algorithm that extends traditional policy optimization methods by considering the relative performance of policies within a group or ensemble of agents or policies. Rather than optimizing each policy independently, GRPO leverages the comparative advantages and performance differences among multiple policies to guide the optimization process. This approach can lead to more robust and diverse policy learning, as it encourages exploration of different strategies while maintaining focus on policies that perform well relative to the group.

However, some implementations of GRPO may not take into account uncertainty of the outputs associated with reward assignment, which may lead to several inefficiencies. For example, conventional GRPO may assign rewards equally (without understanding the level of confidence of individual outputs) across sampled outputs in a group. Thus, at least some outputs may produce unreliable results, which may necessitate additional queries to the LM or additional model training. The additional queries to the LM and model training also results in additional resource utilization, e.g., additional processor usage, additional memory usage, etc. Further, some outputs may be associated with an uncertain status and are not prioritized by conventional GRPO, even when these outputs are associated with a correct status. This may result in outputs that are not rewarded or are rewarded the same as outputs associated with high confidence, despite these low-confidence outputs being useful for training (e.g., factually accurate, logically coherent, without errors, etc.) since these low-confidence outputs may represent areas in which certainty of the model could be improved. In other words, some implementations of GRPO are unable to adjust rewards dynamically at least because outputs associated with a correct status and an uncertain status are not prioritized and/or rewards are assigned equally across sampled outputs in a group. Thus, some implementations of GRPO cannot target improvement where reasoning is vulnerable, leading to slower progress in areas that need the most attention. For the LM to be trained to generate these outputs, additional training may be required, further affecting resource utilization.

Aspects described herein may overcome the aforementioned technical problems, for example, by adjusting rewards dynamically. In certain aspects, adjusting rewards dynamically includes increasing a reward value for an output of an LM, where the output is associated with a correct status and an uncertain status. In certain aspects, the output is reinforced using the increased reward value, and the LM is trained in accordance with the reinforcement of the output.

Aspects of the present disclosure may be used to realize one or more of the following potential advantages. For example, by using the increased reward value for these outputs that are based in part on a confidence score, the LLM training is not limited to equal rewards across sampled outputs irrespective of their confidence levels. In addition, at least because the apparatus causes reinforcement of an output that is associated with a correct status and an uncertain status using the increased reward value to train the LLM, the trained LLM can more consistently generate outputs that are factually accurate, logically coherent, and without errors, and that would not have been prioritized for training in conventional GRPO systems, which are agnostic to confidence. In other words, the apparatuses, methods, and systems described herein optimize resource utilization as the excessive use of computational resources associated with additional queries and training that are required by conventional GRPO is avoided. Thus, training prioritizes low-confidence steps for training, prevents overfitting to high-confidence samples, and reduces redundant reinforcement of well-learned outputs. Thus, computational power can be allocated more effectively since the model can be trained through complex, non-obvious scenarios rather than memorizing high-confidence patterns.

FIG. 1 depicts an example system 100 supporting a plurality of microservices 104 (e.g., software-defined services, which in some cases, may be cloud-native). As shown in FIG. 1, system 100 includes one or more client devices 150 (collectively referred to herein as "client devices 150") and one or more hosts 102 (collectively referred to herein as "hosts 102"). A network 120 may provide connectivity between client device 150 and host 102. Network 120 may include, for example, a direct link, a local area network (LAN), a wide area network (WAN) (such as the Internet), another type of network, or a combination of one or more of these networks.

Host 102 may be geographically co-located servers on the same rack or on different racks in any arbitrary location in a data center. Host 102 may be implemented on a server-grade hardware platform. Host 102 or the hardware platform may include components of a computing device, such as one or more processors (e.g., central processing units (CPUs)), one or more memories (e.g., random access memory (RAM)), one or more network interfaces (e.g., physical network interfaces (PNICs)), storage 106, and/or other components, as described elsewhere herein. Storage 106 and other example components of an apparatus that may implement host 102 are described elsewhere herein.

Host 102 in system 100 may host a set of one or more microservices 104 (collectively referred to herein as "microservice(s) 104"). The microservice(s) 104 may be deployed using virtual machines (VMs) and/or container(s) implemented on host 102). For example, host 102 may implement a hypervisor (not shown) that abstracts processor, memory, storage, and networking resources of host 102's hardware platform). Generally, a microservice 104 is a loosely coupled and independently deployable service or software that, alone or in combination with one or more other microservices 104, may make up an application. Microservice(s) 104 may enable segmented, granular level functionalities within a larger system infrastructure. A reference to a single microservice 104 can encompass multiple microservices 104, unless context indicates otherwise.

Client device 150 may include a user interface (UI) 152. UI 152 may be usable to communicate with microservice 104 via network 120. For example, communication between client devices 150 and a microservice 104 may be facilitated by one or more application programming interfaces (APIs). An API is a set of rules and protocols that allows different software applications to communicate and share data with each other. Non-exhaustive examples of client devices 150 may include a smartphone, a personal computer, a tablet, or a laptop computer. In some examples, microservice 104 may interact with another microservice, an application, a host, or the like, via network 120.

Figure 2:
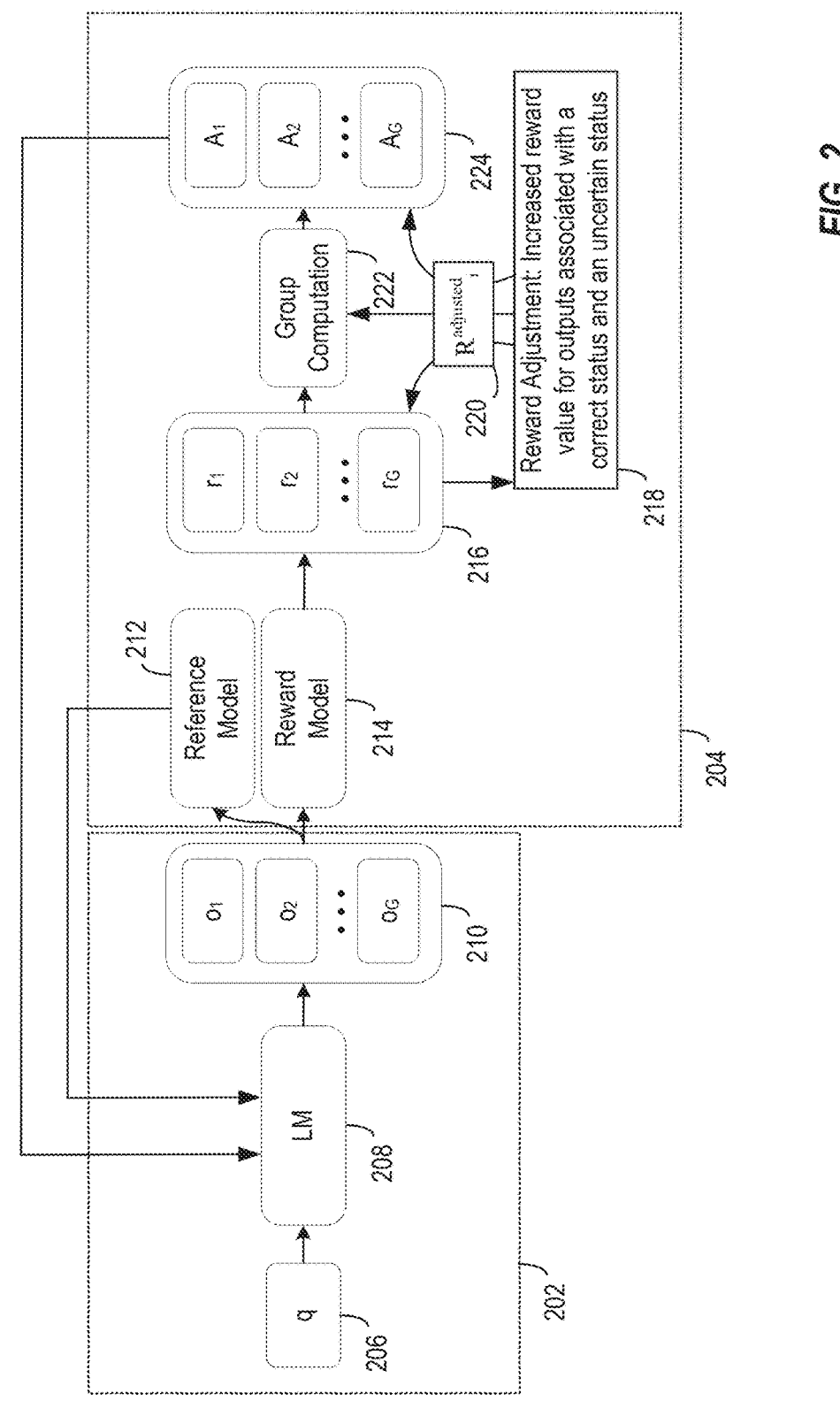
FIG. 2 depicts an example system configured for training an LM and using the trained LM.
Figure 3:
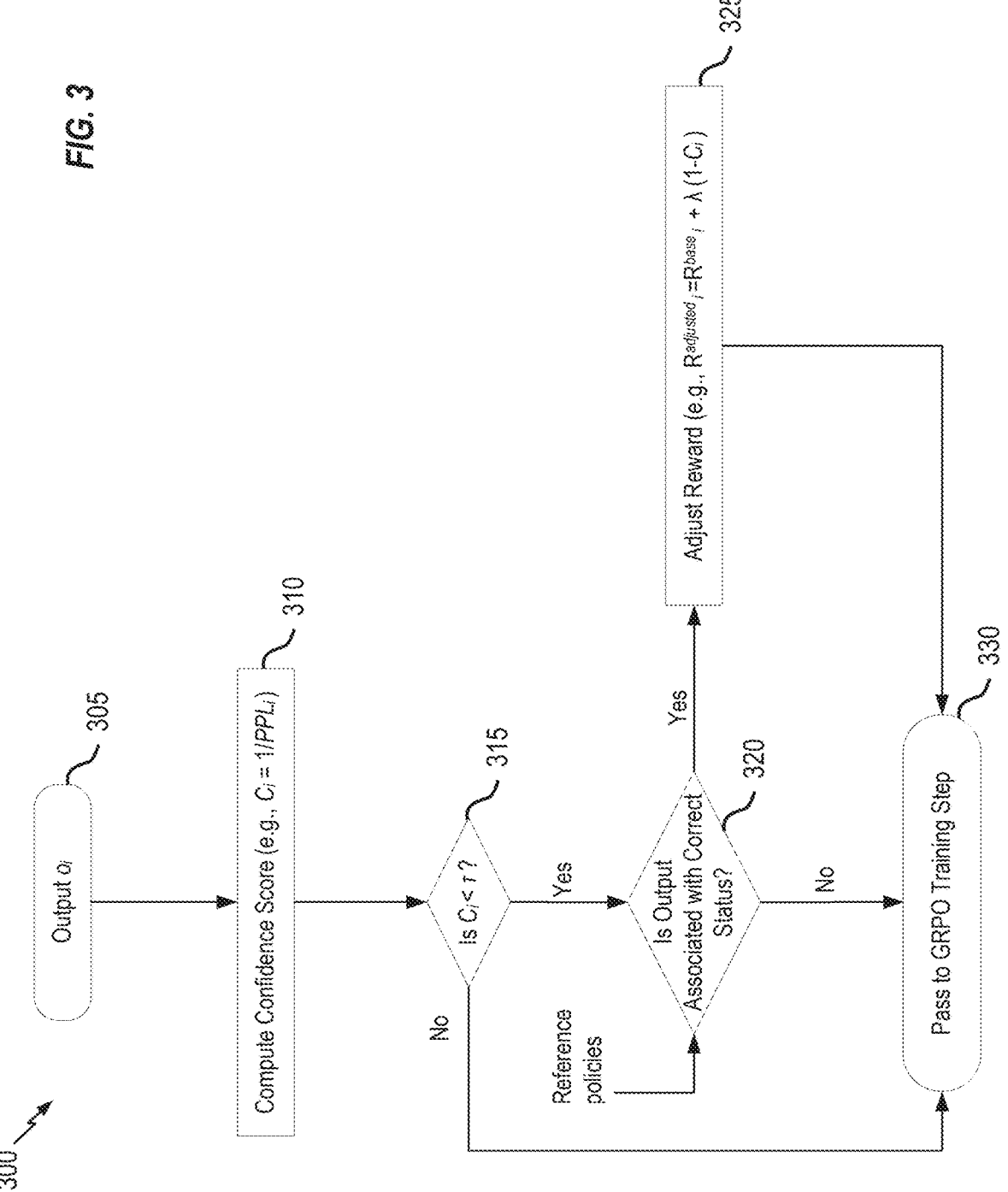
FIG. 3 depicts a flow chart of an example method for adjusting rewards of a GRPO-based model.

As shown in FIG. 1, in certain aspects, microservice 104 implements an LM training microservice, which is any network 120 accessible service where a GRPO-based model causes a reinforcement of an output of an LM using an increased reward value when the output is associated with a correct status and an uncertain status as described with respect to FIGS. 2 and 3. In certain aspects, the LM is trained in accordance with the reinforcement of the output as described with respect to FIGS. 2 and 3. In certain aspects, the output refers to a set of outputs. In some aspects, microservice 104 implements a trained LM microservice, which is any network 120 accessible service where the LLM model that is trained in accordance to the reinforcement of the output is used to generate one or more other outputs as described with respect to FIGS. 2 and 3.

Though FIG. 1 depicts host 102, storage 106, and client device 150 as single devices for case of illustration, host 102, storage 106, and/or client device 150 may be embodied in a variety of forms. Further, though FIG. 1 depicts only one host 102 and one client device 150, other examples may include a different number of hosts 102 and/or client devices 150. Client devices 150 may use any combination of microservices 104 on any host 102 where microservices 104 are deployed.

Example LLM Systems and Methods

FIG. 2 depicts an example system configured for training an LM and using the trained LM. The LM may include an LLM. System 200 includes an LM system 202 and a GRPO-based system 204 (e.g. GRPO-based model). LM system 202 (e.g., including an LLM) may be trained by GRPO-based system 204 using inputs 206 (e.g., q), LM model 208, and outputs 210 (e.g., $O_1$, $O_2$ . . . $O_G$) and the components of GRPO-based system 204. The components of GRPO-based system 204 include reference model 212, reward model 214, rewards 216 (e.g., $r_1$, $r_2$ . . . $r_G$), reward adjustment unit 218, group computation 222, and advantages 224 (e.g., $A_1$, $A_2$ . . . $A_G$). Further, LM 208 may be used to generate outputs 210 based on inputs 206 and the training performed by GRPO-based system 204. In some aspects, the LM training is performed online by GRPO-based system 204 (e.g., while the LM 208 is in use). In some aspects, the LM training is performed offline by GRPO-based system 204 (e.g., before or after the LM is online). In some aspects, inputs 206 that are received and outputs 210 that are generated while LM 208 is online may differ from inputs 206 that are received and outputs 210 that are generated while LM 208 is being trained.

Reference model 212 is configured as an LM model that provides a reference to LM 208. For example, reference model 212 may be the same as or a version of LM 208 before LM 208 is trained. Reference model 212 is configured to provide a reference output to LM 208, which may include or be used to determine a measure of difference between a probability distribution associated with LM 208 and another probability distribution associated with reference model 212 over the same variable. In some aspects, the measure of difference refers to Kullback-Leibler divergence. The reference output from reference model may function to keep changes to LM 208 within a boundary, e.g., such that LM 208 does not drift away from the boundary when LM 208 is trained. In some examples, reference model 212 may be referred to as a reference policy.

Reward model 214 is configured to determine a group of rewards 216 (e.g., $r_1$, $r_2$ . . . $r_G$, G being the quantity of reward a group), where each reward 216 corresponds to an output 210. At least one reward 216 may be a base reward (e.g., $R^{base}_i$, where i is an index which may range from 1 to G). The reward determination performed by Reward model 214 may be based on a pre-trained model, a set of rules, one or more conditions, etc.

Reward adjustment unit 218 is configured to adjust one or more rewards 216 (e.g., $R^{base}_i$) based on one or more parameters associated with the corresponding output 210. For example, reward adjustment unit 218 may be configured to determine a confidence score ($C_i$) of a corresponding output 210. The confidence score may indicate a measure of confidence of the output 210 (e.g., a value that indicates how certain LM 208 is about the corresponding output 210). For example, the confidence score may be a probability that the LM prediction is correct (e.g., a value from within the range 0 to 1). In certain aspects, the confidence score is determined in relation to a perplexity value, where the perplexity value is a measure of uncertainty of output 210. In certain aspects, reward adjustment unit 218 may be configured to determine an adjusted reward 220 (e.g., $R^{adjusted}_i$) based on a base reward (e.g., $R^{base}_i$), the confidence score ($C_i$) of the corresponding output 210, a calibration factor, or a combination thereof, as described below. In certain aspects, the adjusted reward 220 is an increased reward value when compared to a base reward. Thus, in certain aspects, the adjusted reward 220 (e.g., $R^{adjusted}_i$) may be referred to as an increased reward value. Reward adjustment unit 218 may cause a reinforcement of output 210 using the adjusted reward 220 (e.g., increased reward value) and cause training of LM 208 in accordance with the reinforcement of output 210. For example, in the process of training LM 208, a training module may reinforce the output 210 using the adjusted reward 220.

In some aspects, the adjusted reward 220 is determined for certain outputs 210. For example, reward adjustment unit 218 may determine that an output 210 is associated with: (A) a correct status based on a reference policy; and (B) an uncertain status based on the confidence score and a threshold. In certain aspects, reward adjustment unit 218 determines output 210 is associated with the correct status with respect to an input 206 to LM 208 (e.g., LLM) based on a validation process. The validation process may include a factual accuracy check of the output. In other words, a correct status may refer to the output 210 being validated to be factually accurate, logically coherent, without errors, etc. For example, an input 206 may include the query "What is the capital of the United States of America?" and an output 210 that is associated with a correct status is "Washington, D.C.," e.g., the output is the factually correct answer to the query. A correct status can also be applied, for example, for a mathematical calculation by LM 208 that uses a correct process for the mathematical calculation and arrives at a correct mathematical output. In such examples, a mathematical calculation by LM 208 that uses an incorrect process or arrives at an incorrect mathematical output may be associated with an incorrect status. In some aspects, the validation process includes a labeling process, and a label being applied to the output 210 as part of the labeling process indicates the correct status. In some other aspects, the validation process includes comparing a value of the output 210 and a value of (e.g., determined by) the reference policy. A reference policy may include one or more rules for determining whether output 210 is associated with the correct status. In some aspects, the reference policy may be implemented at reference model 212. An uncertain status may include a status associated with the confidence score of the output 210. For example, an uncertain status may indicate that the confidence score of the output 210 satisfies (e.g., is lower than, is lower than or equal to) a threshold ($\tau$) that defines an uncertainty threshold, e.g., $C_i < \tau$.

In certain aspects, group computation 222 may be performed to generate one or more advantages 224 based on rewards 216, adjusted reward 220, or a combination thereof. In certain aspects, an advantage 224 corresponding to an output 210 may be determined relative to an average reward of a group of rewards 216 and/or adjusted reward 220. In certain aspects, an advantage 224 is performance metric of an output 210 relative to the group of outputs 210. The performance metric may be a value (e.g. between −1 and +1, or any other range) and may be a measure of correctness (or relative strength) of an output 210 when compared to other outputs 210 (e.g., group of outputs 210). For example, the performance metric corresponding to an output 210 may be a value (e.g., +0.8) which indicates that the output 210 is more closely associated with a correct status than other outputs 210 having a lower performance metric value.

In certain aspects, advantage 224 may be normalized. For example, an advantage 224 may represented as $A_i = r_i - mean(\{r_1, r_2 \ldots r_G\})/std(\{r_1, r_2 \ldots r_G\})$, where $mean(\{r_1, r_2 \ldots r_G\})$ is the mean value of rewards $r_1, r_2 \ldots r_G$, and $std(\{r_1, r_2 \ldots IG\})$ is the standard deviation of rewards $r_1, r_2 \ldots r_G$. In certain aspects, one or more of $r_1, r_2 \ldots r_G$ is a corresponding adjusted reward 220 (e.g., $R^{adjusted}_i$). For example, an advantage may be represented as $A_i = r_i - mean(\{r_1, R^{adjusted}_2 \ldots r_G\})/std(\{r_1, R^{adjusted}_2 \ldots r_G\})$. That is, an advantage 224 may be determined using one or more adjusted rewards 220.

In certain aspects, one or more advantages 224 are generated by reward adjustment unit 218. Advantages 224 may trigger one or more actions. For example, advantages 224 may trigger an action such as providing an indication (e.g., a performance metric) to LM 208, where the indication can be used by LM 208 to update a parameter or policy (e.g., LM weights) for the LM 208 to select certain outputs 210 (e.g., outputs that are closely related to a correct status and/or uncertainty status). In certain aspects, a reward 216 may be updated by reward adjustment unit 218. For example, a reward 216 ($r_2$) may be updated with the adjusted reward 220 ($R^{adjusted}_2$) such that the value of $r_2 = R^{adjusted}_2$ and the value of $r_2$ can be passed downstream as an updated reward.

In certain aspects, adjusted reward 220 is provided by reward adjustment unit 218 to group computation 222, advantages 224, or a combination thereof, thereby providing reinforcement of certain outputs 210 based on the adjusted reward 220. Thus, in certain aspects, reinforcement includes causing an action to be performed in part based on rewards 216, adjusted reward 220, group computation 222, advantages 224, etc. The action may include changing a parameter or policy of LM 208 to favor one or more outputs 210 over other outputs 210 and causing LM 208 to generate the favored one or more outputs 210 in response to an input 206. In certain aspects, the change of parameter or policy of LM 208 may cause the selection of an output 210 that may otherwise be discarded or not selected if the output 210 is not reinforced using the adjusted reward 220 (e.g., increased reward value). In certain aspects, the adjusted reward 220 is also indicated by reward adjustment unit 218 to LM 208 such that LM 208 is further trained by GRPO-based system 204 as described herein.

Once LM 208 is trained, the trained LM 208 can be deployed on a system. That is, by deploying the trained LM 208, the trained LM 208 is configured to receive inputs 206 (e.g., queries from a user), generate outputs 210, and select an output 210 that corresponds to the adjusted reward 220 that was determined during training of LM 208. The selection of outputs 210 may also be performed based on advantages 224, rewards 216, etc., in conformance with the training of the LM 208.

By determining that at least some outputs 210 are associated with correct and uncertain statuses and reinforcing the output using an increased reward value, system 200 avoids assigning high probabilities to incorrect outputs 210 and performs uncertainty-aware reward adjustments. In other words, outputs 210 that are associated with a correct status and a confidence score that satisfies a threshold are rewarded with an adjusted reward 220 (e.g., a reward value that is greater than the base reward), thereby allowing system 200 to reinforce and favor outputs 210, e.g., over incorrect outputs that cause conventional systems to learn undesirable behaviors and generate output base on the undesirable behaviors. This avoids the various LM training cycles and resulting additional resource utilization, e.g., additional processor usage, additional memory usage, etc., that are typical of conventional GRPO systems.

In addition, by using the increased reward value based in part on a confidence score, the LLM training is not limited to equal rewards across sampled outputs as in the case of conventional system. In addition, because system 200 reinforces output 210 that are associated with a correct status and an uncertain status, the trained LM 208 can more consistently generate outputs that are factually accurate, logically coherent, and without errors, and that would have been discarded by a conventionally trained LLM for being uncertain. As such, system 200 also improves resource utilization at least because the excessive use of computational resources associated with additional queries and training that are required by conventional GRPO systems to resolve issues with incorrect output is avoided.

FIG. 3 depicts a flow chart of an example method 300 for adjusting rewards of a GRPO-based model. Any of the steps of method 300 may be performed by any of the systems, apparatuses, and components described herein, e.g., by system 200, LM system 202, GRPO-based system 204, reward adjustment unit 218, processing system 600, etc. Method 300 includes obtaining (block 305) or using outputs ($O_i$) to compute a confidence score. $O_i$ may correspond to outputs 210. Method 300 also includes computing (block 310) a confidence score ($C_i$) of the corresponding output ($O_i$). The confidence score ($C_i$) may be represented as an inverse of a perplexity value. In certain aspects, the confidence score may be represented as $C_i = 1/PPL_i$ where i is an index, $PPL_i$ is the perplexity value, and $C_i$ is the confidence score of the corresponding output ($O_i$).

Method 300 also includes determining (block 315) whether $C_i$ is below a threshold ($\tau$) and if $C_i$ is below (or equal to) a threshold ($\tau$), determining (block 320), based on reference policies, whether the output ($O_i$) is associated with a correct status (e.g., the output is factually correct). Reference policies may include rules for determining whether the output is associated with a correct status. If the output ($O_i$) is associated with a correct status, method 300 includes determining (block 325) an adjusted reward (e.g., corresponding to adjusted reward 220). In certain aspects, the adjusted reward is referred to as an increased reward value. In certain aspects, the adjusted reward is represented as $R^{adjusted}_i = R^{base}_i + \lambda (1 - C_i)$, where i is an index of the corresponding output, $R^{base}_i$ is a base reward of the corresponding output, A is a calibration factor, $C_i$ is the confidence score, and $R^{adjusted}_i$ is the increased reward value. In certain aspects, calibration factor ($\lambda$) is a hyperparameter that may be used to control how the LM (e.g., LM 208) learns using the adjusted reward. In certain aspects, a system such as system 200 (e.g., GRPO-based system 204) may determine and/or update calibration factor ($\lambda$) before, during, or after training. For example, calibration factor ($\lambda$) may be increased, decreased, or kept unchanged before, during, or after training to control the value of adjusted reward (e.g., $R^{adjusted}_i$), thereby controlling how much reward is given to an output ($O_i$). In certain aspects, $R^{base}_i = R^{correct}_i + R^{format}_i$, where $R^{format}_i$ checks if the output has the tags: <think></think>. For example, <think></think> may be a regular expression used as a way to ensure the LM maintains a structured format (e.g., first 'thinking', then 'answering'). In certain aspects, <think></think>«answer></answer> may be used to generate outputs ($O_i$) that include content enclosed within the «answer></answer> tags. Method 300 also includes passing to GRPO training step (block 330). The GRPO training step may include any of the steps performed by system 200, e.g., group computation, determination of advantages 224, outputting the advantages to LM 208, any of which may be performed based on the adjusted reward.

If $C_i$ is not below (or equal to) $\tau$, (block 315) or $O_i$ (block 320) is not associated with a correct status, method 300 continues to pass to GRPO training step (block 330), e.g., without determining an adjusted reward for $O_i$. For example, $R^{base}_i$ or another reward value without an increased reward value may be used as the reward for $O_i$. As such, method 300 determines that at least some outputs 210 are associated with correct and uncertain statuses and causes reinforcement of these outputs using an increased reward value.

In certain aspects, a system (corresponding to any of the systems or components) described herein is configured to refine a reward assignment process by incorporating confidence-aware adjustments (e.g., using a confidence score). The system dynamically quantifies confidence per generated output, verifies that the output is associated with a correct status, and modifies rewards to: reward uncertain but correct outputs more strongly, prevent reinforcement of incorrect but high-confidence responses, guide training toward reasoning areas with lower confidence scores, etc.

In certain aspects, the system is configured to generate model outputs, computer a perplexity-based confidence score, verify correctness, apply a confidence-weighted reward adjustment, and pass adjusted rewards to perform GRPO training. For example, to generate model outputs, the GRPO-based model generates multiple outputs for a given input. Further, the system calculates the perplexity (PPL) of each output, which serves as an inverse measure of confidence, and derives a confidence score based on PPL, e.g., $C_i = 1/PPL_i$. The system may verify correctness by evaluating whether each generated output is associated with a correct status using external validation techniques (e.g., factual accuracy checks, human labels, or automated scoring models). For example, outputs may be validated using an "LLM-as-a-judge" process, which may use the LM or other LMs to determine whether the outputs meet a one or more conditions (e.g., that the outputs are factually accurate). The validation may also be performed by a human user, using a ground truth, or a combination thereof. In addition, applying a confidence-weighted reward adjustment may include, if a response is associated with a correct status but uncertain (low-confidence), increasing the corresponding reward to encourage learning in certain areas. If a response is incorrect, no additional reward is granted, preventing reinforcement of errors. Further, passing adjusted rewards to GRPO training may include using the adjusted reward values to update the policy (e.g., a parameter of the LM), ensuring that uncertain but correct outputs receive stronger reinforcement. In certain aspects, the system targets improvement where reasoning may be vulnerable, incrementing progress in areas that need the most attention.

The systems described herein may be beneficial also because the systems provide enhanced reward scaling, a prioritized learning focus, and efficient training resource utilization. More specifically, enhanced reward scaling ensures training prioritizes low-confidence steps. This approach can be applied to LMs to improve general reasoning capabilities, e.g., so that reasoning-focused training improves general performance. In addition, by prioritizing learning focus, overfitting of high-confidence samples is prevented and LMs can process queries by emphasizing areas of uncertainty where logical reasoning may be needed. In addition, efficient training resource utilization may result at least by reducing redundant reinforcement of well-learned outputs. These benefits allow LMS to allocate computational resources such as processing resources more effectively, ensuring that the LM learns to reason through complex, non-obvious scenarios, rather than memorizing high-confidence patterns.

Example Method for Training an LLM

FIG. 4 depicts an example method 400 for training an LM. In one aspect, method 400 can be implemented by the system 100 of FIG. 1 (and/or one or more of its components such as microservices 104), system 200 of FIG. 2 (and/or one or more of its components), and/or processing system 600 of FIG. 6 (and/or one or more of its components).

Method 400 begins at block 405 with generating, using an LM, one or more outputs. This is described at least in connection with system 200 in FIG. 2, where LM 208 (e.g., an LLM) is configured to generate outputs 210.

Method 400 then proceeds to block 410 with computing a confidence score of an output of the one or more outputs based on a perplexity value of the output. This is described at least in connection with system 200 in FIG. 2, where reward adjustment unit 218 may be configured to determine a confidence score ($C_i$) of a corresponding output 210, and the confidence score ($C_i$) is determined in relation to a perplexity value.

Method 400 then proceeds to block 415 with determining, by a GRPO-based model, that the output is: associated with a correct status based on a reference policy associated with an uncertain status based on the confidence score and a threshold. This is described at least in connection with system 200 in FIG. 2, where reward adjustment unit 218 (of GRPO-based system 204) may determine that an output 210 is associated with: (A) a correct status based on a reference policy; and (B) an uncertain status based on the confidence score and a threshold.

Method 400 then proceeds to block 420 with determining, by the GRPO-based model, an increased reward value for the output that is associated with the correct status and the uncertain status based at least in part on a base reward value and the confidence score. This is described at least in connection with system 200 in FIG. 2, where reward adjustment unit 218 (of GRPO-based system 204) may be configured to determine an adjusted reward 220 (e.g., $R^{adjusted}_i$) based on a base reward (e.g., $R^{base}_i$) and the confidence score ($C_i$) of the corresponding output 210.

Method 400 then proceeds to block 425 with causing, by the GRPO-based model, a reinforcement of the output using the increased reward value. This is described at least in connection with system 200 in FIG. 2, where reward adjustment unit 218 may cause a reinforcement of output 210 using the adjusted reward 220 (e.g., increased reward value).

Method 400 then proceeds to block 430 with training the LM in accordance with the reinforcement of the output. This is described at least in connection with system 200 in FIG. 2, where reward adjustment unit 218 may cause training of LM 208 in accordance with the reinforcement of output 210.

In some aspects, method 400 further includes causing one or more actions to be performed based on the reinforcement. This is described at least in connection with system 200 in FIG. 2, where reinforcement by reward adjustment unit 218 includes causing an action to be performed in part based on rewards 216, adjusted reward 220, group computation 222, advantages 224, etc.

In some aspects, the perplexity value is a measure of uncertainty of the output, and the confidence score is a measure of confidence of the output. This is described at least in connection with system 200 in FIG. 2, where the confidence score refers to a measure of confidence of the output 210, and the perplexity value is a measure of uncertainty of output 210.

In some aspects, the confidence score is represented as an inverse of the perplexity value. This is described at least in connection with system 200 in FIG. 2, where the confidence score ($C_i$) may be represented as an inverse of a perplexity value.

In some aspects, block 415 includes: determining that the output is associated with the correct status with respect to an input to the LM based on a validation process, the validation process comprising at least one of a factual accuracy check of the output, a labeling process, or comparing a value of the output and a value of the reference policy. This is described at least in connection with system 200 in FIG. 2, where reward adjustment unit 218 determines output 210 is associated with the correct status with respect to an input 206 to LM 208 (e.g., LLM) based on a validation process.

In some aspects, block 415 includes: determining that confidence score of the output is below the threshold. This is described at least in connection with system 200 in FIG. 2, where reward adjustment unit 218 determines an uncertain status may indicate that the confidence score of the output 210 satisfies a threshold ($\tau$).

In some aspects, the increased reward value is based on the base reward value of the output, a calibration factor, and the confidence score. This is described at least in connection with system 200 in FIG. 2, where reward adjustment unit 218 may be configured to determine an adjusted reward 220 (e.g., $R^{adjusted}_i$) based on a base reward (e.g., $R^{base}_i$), the confidence score ($C_i$) of the corresponding output 210, a calibration factor, or a combination thereof.

In some aspects, method 400 further includes reinforcing, based on another output being at least one of associated with an incorrect status or not associated with the uncertain status, the other output without increasing the base reward value. This is described at least in connection with method 300 in FIG. 2 (e.g. performed by system 200), where if C; is not below threshold, t, (block 315) or the output, $O_i$, (block 320) is not associated with a correct status, method 300 continues to passing to GRPO training step (block 330), e.g., without determining an adjusted reward for the output, $O_i$.

In some aspects, the LM is trained when the LM is in at least one of an offline mode or an online mode. This is described at least in connection with system 200 in FIG. 2, where GRPO-based system 204 performs the LM training online and/or offline.

Note that FIG. 4 is just one example of a method, and other methods including fewer, additional, or alternative operations are possible consistent with this disclosure.

Example Method for Performing One or More Actions Based on Reinforcement

FIG. 5 depicts an example method 500 for performing one or more actions based on reinforcement. In one aspect, method 500 can be implemented by the system 100 of FIG. 1 (and/or one or more of its components such as microservices 104), system 200 of FIG. 2 (and/or one or more of its components), and/or processing system 600 of FIG. 6 (and/or or one or more of its components).

Method 500 begins at block 505 with generating, using an LM, a plurality of outputs. This is described at least in connection with system 200 in FIG. 2, where LM 208 (e.g., an LLM) is configured to generate outputs 210.

Method 500 then proceeds to block 510 with computing a confidence score of each output of the plurality of outputs based on a respective perplexity value of the plurality of outputs. This is described at least in connection with system 200 in FIG. 2, where reward adjustment unit 218 may be configured to determine a confidence score ($C_i$) of a corresponding output 210, and the confidence score ($C_i$) is determined in relation to a perplexity value.

Method 500 then proceeds to block 515 with determining, by a GRPO-based model, that a set of outputs of the plurality of outputs are: associated with a correct status based on a reference policy associated with an uncertain status based on the confidence score satisfying a threshold for the set of outputs. This is described at least in connection with system 200 in FIG. 2, where reward adjustment unit 218 (of GRPO-based system 204) may determine that an output 210 is associated with: (A) a correct status based on a reference policy; and (B) an uncertain status based on the confidence score and a threshold.

Method 500 then proceeds to block 520 with determining, by the GRPO-based model, an increased reward value for the set of outputs that are associated with the correct status and the uncertain status based at least in part on a base reward value and the confidence score. This is described at least in connection with system 200 in FIG. 2, where reward adjustment unit 218 218 (of GRPO-based system 204) may be configured to determine an adjusted reward 220 (e.g., $R^{adjusted}_i$) based on a base reward (e.g., $R^{base}_i$) and the confidence score $(C_i)$ of the corresponding output 210.

Method 500 then proceeds to block 525 with causing, by the GRPO-based model, a reinforcement of the set of outputs using the increased reward value. This is described at least in connection with system 200 in FIG. 2, where reward adjustment unit 218 may cause a reinforcement of output 210 using the adjusted reward 220 (e.g., increased reward value).

Method 500 then proceeds to block 530 with performing one or more actions based on the reinforcement. This is described at least in connection with system 200 in FIG. 2, where reinforcement by reward adjustment unit 218 includes causing an action to be performed in part based on rewards 216, adjusted reward 220, group computation 222, advantages 224, etc.

In some aspects, the perplexity value is a measure of uncertainty of the plurality of outputs, and the confidence score is a measure of confidence of the plurality of outputs. This is described at least in connection with system 200 in FIG. 2, where the confidence score refers to a measure of confidence of the output 210, and the perplexity value is a measure of uncertainty of output 210.

In some aspects, the confidence score is represented as an inverse of the perplexity value. This is described at least in connection with system 200 in FIG. 2, where the confidence score $(C_i)$ may be represented as an inverse of a perplexity value.

In some aspects, block 515 includes: determining that the set of outputs is associated with the correct status with respect to an input to the LM based on a validation process, the validation process comprising at least one of a factual accuracy check of the set of outputs, a labeling process, or comparing a value of the set of outputs and a value of the reference policy. This is described at least in connection with system 200 in FIG. 2, where reward adjustment unit 218 determines output 210 is associated with the correct status with respect to an input 206 to LM 208 (e.g., LLM) based on a validation process.

In some aspects, block 515 includes: determining that confidence score of the set of outputs is below the threshold. This is described at least in connection with system 200 in FIG. 2, where reward adjustment unit 218 determines an uncertain status may indicate that the confidence score of the output 210 satisfies a threshold $(\tau)$.

In some aspects, the increased reward value is based on the base reward value of the set of outputs, a calibration factor, and the confidence score. This is described at least in connection with system 200 in FIG. 2, where reward adjustment unit 218 may be configured to determine an adjusted reward 220 (e.g., $R^{adjusted}_i$) based on a base reward (e.g., $R^{base}_i$), the confidence score $(C_i)$ of the corresponding output 210, a calibration factor, or a combination thereof.

In some aspects, method 500 further includes reinforcing, based on another set of outputs being at least one of associated with an incorrect status or not associated with the uncertain status, the other set of outputs without increasing the base reward value. This is described at least in connection with method 300 in FIG. 2 (e.g. performed by system 200), where if $C_i$ is not below threshold, T, (block 315) or the output, $O_i$, (block 320) is not associated with a correct status, method 300 continues to passing to GRPO training step (block 330), e.g., without determining an adjusted reward for the output, $O_i$.

In some aspects, method 500 further includes training the LM in accordance with the reinforcement of the set of outputs. This is described at least in connection with method 300 in FIG. 2, where reward adjustment unit 218 may cause a reinforcement of output 210 using the adjusted reward 220 (e.g., increased reward value) and cause training of LM 208 in accordance with the reinforcement of output 210.

In some aspects, method 500 further includes updating one or more policies associated with the LM, the updated one or more policies triggering the LM to select an output of the set of outputs as an answer to an input to the LM. This is described at least in connection with method 300 in FIG. 2, where an action may include changing a parameter or policy of LM 208 to favor one or more outputs 210 over other outputs 210 and causing LM 208 to generate the favored one or more outputs 210 in response to an input 206.

In some aspects, the selected output is discardable as the answer by the LM if the output is not reinforced using the increased reward value. This is described at least in connection with method 300 in FIG. 2, where the change of parameter or policy of LM 208 may cause the selection of an output 210 that may otherwise be discarded or not selected if the output 210 is not reinforced using the adjusted reward 220 (e.g., increased reward value).

Note that FIG. 5 is just one example of a method, and other methods including fewer, additional, or alternative operations are possible consistent with this disclosure.

Example Processing System

Figure 6:
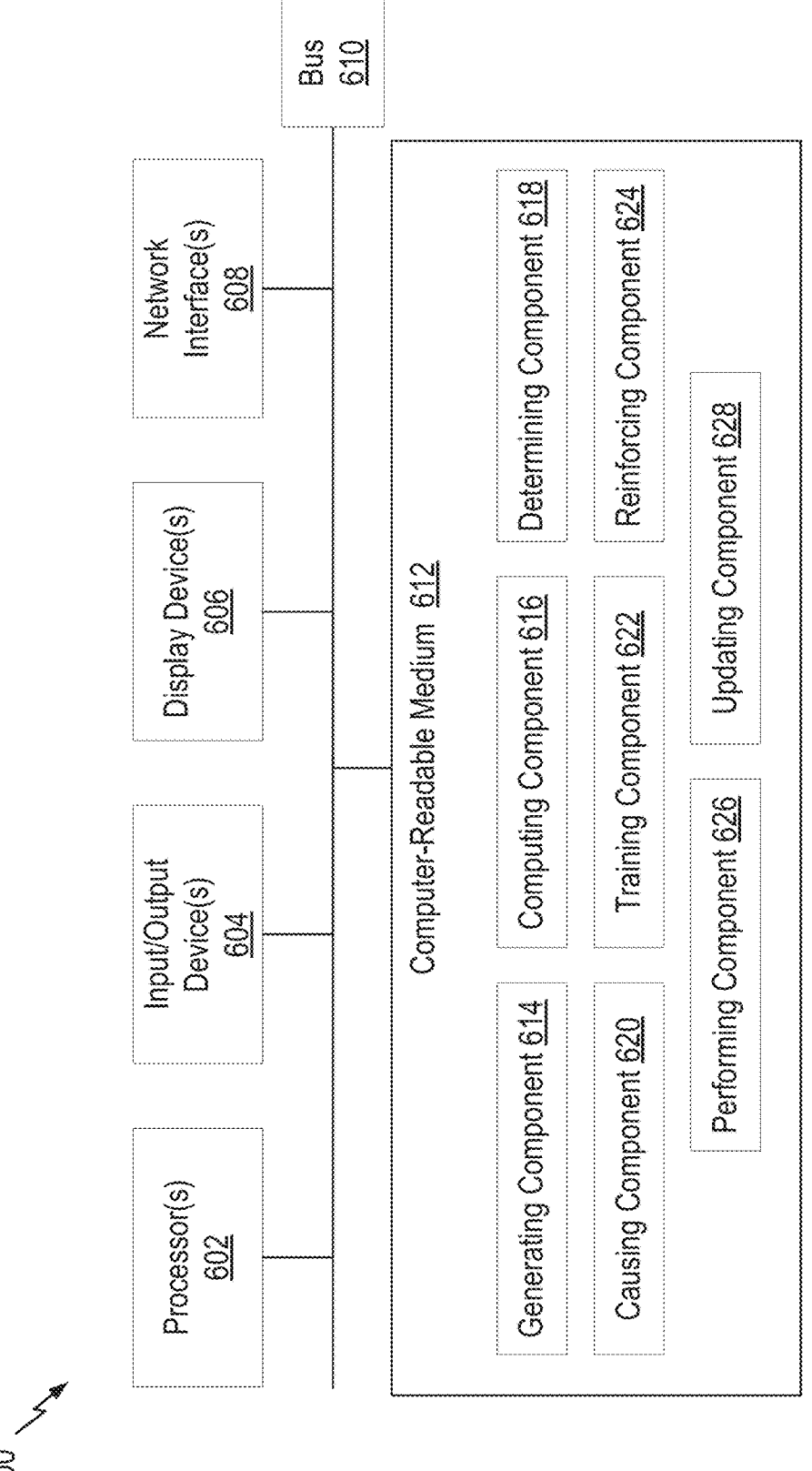
FIG. 6 depicts an example processing system with which aspects of the present disclosure can be performed.

FIG. 6 depicts an example processing system 600 configured to perform various aspects described herein, including, for example, method 400 as described above with respect to FIG. 4 and method 500 as described above with respect to FIG. 5.

Processing system 600 is an example of an electronic device configured to execute computer-executable instructions, such as those derived from compiled computer code, including without limitation personal computers, tablet computers, servers, smart phones, smart phones, smart devices, wearable devices, augmented and/or virtual reality devices, and others.

In the depicted example, processing system 600 includes one or more processors 602, one or more input/output devices 604, one or more display devices 606, one or more network interfaces 608 through which processing system 600 is connected to one or more networks (e.g., a local network, an intranet, the Internet, or any other group of processing systems communicatively connected to each other), and computer-readable medium 612. In the depicted example, the aforementioned components are coupled by a bus 610, which may generally be configured for data exchange amongst the components. Bus 610 may be representative of multiple buses, while only one is depicted for simplicity.

Processor(s) 602 are generally configured to retrieve and execute instructions stored in one or more memories, including local memories like computer-readable medium 612, as well as remote memories and data stores. Similarly, processor(s) 602 are configured to store application data residing in local memories like the computer-readable medium 612, as well as remote memories and data stores. More generally, bus 610 is configured to transmit programming instructions and application data among the processor(s) 602, display device(s) 606, network interface(s) 608, and/or computer-readable medium 612. In certain embodiments, processor(s) 602 are representative of a one or more central processing units (CPUs), graphics processing unit (GPUs), tensor processing unit (TPUs), accelerators, and other processing devices.

Input/output device(s) 604 may include any device, mechanism, system, interactive display, and/or various other hardware and software components for communicating information between processing system 600 and a user of processing system 600. For example, input/output device(s) 604 may include input hardware, such as a keyboard, touch screen, button, microphone, speaker, and/or other device for receiving inputs from the user and sending outputs to the user.

Display device(s) 606 may generally include any sort of device configured to display data, information, graphics, user interface elements, and the like to a user. For example, display device(s) 606 may include internal and external displays such as an internal display of a tablet computer or an external display for a server computer or a projector. Display device(s) 606 may further include displays for devices, such as augmented, virtual, and/or extended reality devices. In various embodiments, display device(s) 606 may be configured to display a graphical user interface.

Network interface(s) 608 provide processing system 600 with access to external networks and thereby to external processing systems. Network interface(s) 608 can generally be any hardware and/or software capable of transmitting and/or receiving data via a wired or wireless network connection. Accordingly, network interface(s) 608 can include a communication transceiver for sending and/or receiving any wired and/or wireless communication.

Computer-readable medium 612 may be a volatile memory, such as a random access memory (RAM), or a nonvolatile memory, such as nonvolatile random access memory (NVRAM), or the like. In this example, computer-readable medium 612 includes generating component 614, computing component 616, determining component 618, causing component 620, training component 622, reinforcing component 624, performing component 626, and updating component 628. Processing of the components 614-628 may enable and cause the processing system 600 to perform the method 400 described with respect to FIG. 4 and the method 500 described with respect to FIG. 5, or any aspect related to it.

In certain embodiments, generating component 614 is configured to generate, using an LM, one or more outputs, as described in FIG. 4 with reference to block 405. In certain embodiments, computing component 616 is configured to compute a confidence score of an output of the one or more outputs based on a perplexity value of the output, as described in FIG. 4 with reference to block 410. In certain embodiments, determining component 618 is configured to determine, by a GRPO-based model, that the output is: associated with a correct status based on a reference policy; and associated with an uncertain status based on the confidence score and a threshold, as described in FIG. 4 with reference to block 415. In certain embodiments, determining component 618 is configured to determine, by the GRPO-based model, an increased reward value for the output that is associated with the correct status and the uncertain status based at least in part on a base reward value and the confidence score, as described in FIG. 4 with reference to block 420. In certain embodiments, causing component 620 is configured to cause, by the GRPO-based model, a reinforcement of the output using the increased reward value, as described in FIG. 4 with reference to block 425. In certain embodiments, training component 622 is configured to train the LM in accordance with the reinforcement of the output, as described in FIG. 4 with reference to block 430.

In certain embodiments, generating component 614 is configured to generate, using an LM, a plurality of outputs, as described in FIG. 5 with reference to block 505. In certain embodiments, computing component 616 is configured to compute a confidence score of each output of the plurality of outputs based on a respective perplexity value of the plurality of outputs, as described in FIG. 5 with reference to block 510. In certain embodiments, determining component 618 is configured to determine, by a GRPO-based model, that a set of outputs of the plurality of outputs are: associated with a correct status based on a reference policy; and associated with an uncertain status based on the confidence score satisfying a threshold for the set of outputs, as described in FIG. 5 with reference to block 515. In certain embodiments, determining component 618 is configured to determine, by the GRPO-based model, an increased reward value for the set of outputs that are associated with the correct status and the uncertain status based at least in part on a base reward value and the confidence score, as described in FIG. 5 with reference to block 520. In certain embodiments, causing component 620 is configured to cause, by the GRPO-based model, a reinforcement of the set of outputs using the increased reward value, as described in FIG. 5 with reference to block 525. In certain embodiments, performing component 626 is configured to perform one or more actions based on the reinforcement, as described in FIG. 5 with reference to block 530.

Note that FIG. 6 is just one example of a processing system consistent with aspects described herein, and other processing systems having additional, alternative, or fewer components are possible consistent with this disclosure.

Example Clauses

Implementation examples are described in the following numbered clauses:

Clause 1: A method, comprising: generating, using an LM, one or more outputs; computing a confidence score of an output of the one or more outputs based on a perplexity value of the output; determining, by a GRPO-based model, that the output is: associated with a correct status based on a reference policy associated with an uncertain status based on the confidence score and a threshold; determining, by the GRPO-based model, an increased reward value for the output that is associated with the correct status and the uncertain status based at least in part on a base reward value and the confidence score; causing, by the GRPO-based model, a reinforcement of the output using the increased reward value; and training the LM in accordance with the reinforcement of the output.

Clause 2: The method of Clause 1, further comprising causing one or more actions to be performed based on the reinforcement.

Clause 3: The method of any one of Clauses 1-2, wherein the perplexity value is a measure of uncertainty of the output, and the confidence score is a measure of confidence of the output.

Clause 4: The method of any one of Clauses 1-3, wherein the confidence score is represented as an inverse of the perplexity value.

Clause 5: The method of any one of Clauses 1-4, wherein determining that the output is associated with the correct status comprises: determining that the output is associated with the correct status with respect to an input to the LM based on a validation process, the validation process comprising at least one of a factual accuracy check of the output, a labeling process, or comparing a value of the output and a value of the reference policy.

Clause 6: The method of any one of Clauses 1-5, wherein determining that the output is associated with the uncertain status comprises: determining that confidence score of the output is below the threshold.

Clause 7: The method of any one of Clauses 1-6, wherein the increased reward value is based on the base reward value of the output, a calibration factor, and the confidence score.

Clause 8: The method of any one of Clauses 1-7, comprising: reinforcing, based on another output being at least one of associated with an incorrect status or not associated with the uncertain status, the other output without increasing the base reward value.

Clause 9: The method of any one of Clauses 1-8, wherein the LM is trained when the LM is in at least one of an offline mode or an online mode.

Clause 10: A method, comprising: generating, using an LM, a plurality of outputs; computing a confidence score of each output of the plurality of outputs based on a respective perplexity value of the plurality of outputs; determining, by a GRPO-based model, that a set of outputs of the plurality of outputs are: associated with a correct status based on a reference policy associated with an uncertain status based on the confidence score satisfying a threshold for the set of outputs; determining, by the GRPO-based model, an increased reward value for the set of outputs that are associated with the correct status and the uncertain status based at least in part on a base reward value and the confidence score; causing, by the GRPO-based model, a reinforcement of the set of outputs using the increased reward value; and performing one or more actions based on the reinforcement.

Clause 11: The method of Clause 10, wherein the perplexity value is a measure of uncertainty of the plurality of outputs, and the confidence score is a measure of confidence of the plurality of outputs.

Clause 12: The method of any one of Clauses 10-11, wherein the confidence score is represented as an inverse of the perplexity value.

Clause 13: The method of any one of Clauses 10-12, wherein determining that the set of outputs is associated with the correct status comprises: determining that the set of outputs is associated with the correct status with respect to an input to the LM based on a validation process, the validation process comprising at least one of a factual accuracy check of the set of outputs, a labeling process, or comparing a value of the set of outputs and a value of the reference policy.

Clause 14: The method of any one of Clauses 10-13, wherein determining that the set of outputs is associated with the uncertain status comprises: determining that confidence score of the set of outputs is below the threshold.

Clause 15: The method of any one of Clauses 10-14, wherein the increased reward value is based on the base reward value of the set of outputs, a calibration factor, and the confidence score.

Clause 16: The method of any one of Clauses 10-15, comprising: reinforcing, based on another set of outputs being at least one of associated with an incorrect status or not associated with the uncertain status, the other set of outputs without increasing the base reward value.

Clause 17: The method of any one of Clauses 10-16, further comprising: training the LM in accordance with the reinforcement of the set of outputs.

Clause 18: The method of any one of Clauses 10-17, further comprising: updating one or more policies associated with the LM, the updated one or more policies triggering the LM to select an output of the set of outputs as an answer to an input to the LM.

Clause 19: The method of Clause 18, wherein the selected output is discardable as the answer by the LM if the output is not reinforced using the increased reward value.

Clause 20: A processing system, comprising: memory comprising computer-executable instructions; and one or more processors configured to execute the computer-executable instructions and cause the processing system to perform a method in accordance with any one of Clauses 1-19.

Clause 21: A processing system, comprising means for performing a method in accordance with any one of Clauses 1-19.

Clause 22: A non-transitory computer-readable medium storing program code for causing a processing system to perform the steps of any one of Clauses 1-19.

Clause 23: A computer program product embodied on a computer-readable storage medium comprising code for performing a method in accordance with any one of Clauses 1-19.

Additional Considerations

The preceding description is provided to enable any person skilled in the art to practice the various embodiments described herein. The examples discussed herein are not limiting the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Reference to an element in the singular is not intended to mean only one unless specifically so stated, but rather "one or more." For example, reference to an element (e.g., "a processor," "a memory," etc.), unless otherwise specifically stated, should be understood to refer to one or more elements (e.g., "one or more processors," "one or more memories," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f)

unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   generating, using a language model (LM), one or more outputs;
   computing a confidence score of an output of the one or more outputs based on a perplexity value of the output;
   determining, by a group relative policy optimization (GRPO)-based model, that the output is:
      associated with a correct status based on a reference policy; and
      associated with an uncertain status based on the confidence score and a threshold;
   determining, by the GRPO-based model, an increased reward value for the output that is associated with the correct status and the uncertain status based at least in part on a base reward value and the confidence score;
   causing, by the GRPO-based model, a reinforcement of the output using the increased reward value; and
   training, by the GRPO-based model, the LM in accordance with the reinforcement of the output, the training of the LM comprising causing one or more actions to be performed based on the reinforcement, the one or more actions comprising transmitting data to update one or more policies associated with the LM.

2. The method of claim 1, wherein the perplexity value is a measure of uncertainty of the output, and the confidence score is a measure of confidence of the output.

3. The method of claim 1, wherein the confidence score is represented as an inverse of the perplexity value.

4. The method of claim 1, wherein determining that the output is associated with the correct status comprises:
   determining that the output is associated with the correct status with respect to an input to the LM based on a validation process, the validation process comprising at least one of a factual accuracy check of the output, a labeling process, or comparing a value of the output and a value of the reference policy.

5. The method of claim 1, wherein determining that the output is associated with the uncertain status comprises:
   determining that confidence score of the output is below the threshold.

6. The method of claim 1, wherein the increased reward value is based on the base reward value of the output, a calibration factor, and the confidence score.

7. The method of claim 1, comprising:
   reinforcing, based on another output being at least one of associated with an incorrect status or not associated with the uncertain status, the other output without increasing the base reward value.

8. The method of claim 1, wherein the LM is trained when the LM is in at least one of an offline mode or an online mode.

9. A method, comprising:

generating, using a language model (LM), a plurality of outputs;

computing a confidence score of each output of the plurality of outputs based on a respective perplexity value of the plurality of outputs;

determining, by a group relative policy optimization (GRPO)-based model, that a set of outputs of the plurality of outputs are:

associated with a correct status based on a reference policy; and associated with an uncertain status based on the confidence score satisfying a threshold for the set of outputs;

determining, by the GRPO-based model, an increased reward value for the set of outputs that are associated with the correct status and the uncertain status based at least in part on a base reward value and the confidence score;

causing, by the GRPO-based model, a reinforcement of the set of outputs using the increased reward value; and performing, by the GRPO-based model, one or more actions based on the reinforcement, the one or more actions comprising transmitting data to update one or more policies associated with the LM.

10. The method of claim 9, wherein the perplexity value is a measure of uncertainty of the plurality of outputs, and the confidence score is a measure of confidence of the plurality of outputs.

11. The method of claim 9, wherein the confidence score is represented as an inverse of the perplexity value.

12. The method of claim 9, wherein determining that the set of outputs is associated with the correct status comprises:

determining that the set of outputs is associated with the correct status with respect to an input to the LM based on a validation process, the validation process comprising at least one of a factual accuracy check of the set of outputs, a labeling process, or comparing a value of the set of outputs and a value of the reference policy.

13. The method of claim 9, wherein determining that the set of outputs is associated with the uncertain status comprises:

determining that confidence score of the set of outputs is below the threshold.

14. The method of claim 9, wherein the increased reward value is based on the base reward value of the set of outputs, a calibration factor, and the confidence score.

15. The method of claim 9, comprising:

reinforcing, based on another set of outputs being at least one of associated with an incorrect status or not associated with the uncertain status, the other set of outputs without increasing the base reward value.

16. The method of claim 9, further comprising:

training the LM in accordance with the reinforcement of the set of outputs.

17. The method of claim 9, further comprising:

updating one or more policies associated with the LM, the updated one or more policies triggering the LM to select an output of the set of outputs as an answer to an input to the LM.

18. The method of claim 17, wherein the selected output is discardable as the answer by the LM if the output is not reinforced using the increased reward value.

19. An apparatus comprising a processing system that includes one or more memories and one or more processors coupled to the one or more memories, the processing system configured to cause the apparatus to:

generate, using a large language model (LLM), one or more outputs;

compute a confidence score of an output of the one or more outputs based on a perplexity value of the output;

determine, by a group relative policy optimization (GRPO)-based model, that the output is:

associated with a correct status based on a reference policy; and associated with an uncertain status based on the confidence score and a threshold;

determine, by the GRPO-based model, an increased reward value for the output that is associated with the correct status and the uncertain status based at least in part on a base reward value and the confidence score;

cause, by the GRPO-based model, a reinforcement of the output using the increased reward value; and train, by the GRPO-based model, the LLM in accordance with the reinforcement of the output, wherein to train the LLM the processing system is further configured to cause the apparatus to cause one or more actions to be performed based on the reinforcement, the one or more actions comprising transmitting data to update one or more policies associated with the LM.

20. The apparatus of claim 19, wherein the processing system is further configured to cause the apparatus to:

reinforce, based on another output being at least one of associated with an incorrect status or not associated with the uncertain status, the other output without increasing the base reward value.

\* \* \* \* \*